(12) United States Patent
Shibata et al.

(10) Patent No.: US 8,922,696 B2
(45) Date of Patent: *Dec. 30, 2014

(54) PORTABLE TERMINAL WITH ROTATABLE AXIAL FLIP UNIT AND DUAL LENS ARRANGEMENT

(75) Inventors: Junichiro Shibata, Tokyo (JP); Shuuji Yamaguchi, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 438 days.

This patent is subject to a terminal disclaimer.

(21) Appl. No.: 13/271,729

(22) Filed: Oct. 12, 2011

(65) Prior Publication Data

US 2012/0033029 A1   Feb. 9, 2012

Related U.S. Application Data

(63) Continuation of application No. 12/349,800, filed on Jan. 7, 2009, now Pat. No. 8,068,161, and a continuation of application No. 11/409,526, filed on Apr. 21, 2006, now Pat. No. 7,492,407, and a continuation of application No. 09/733,984, filed on Dec. 12, 2000, now Pat. No. 7,084,919.

(30) Foreign Application Priority Data

Dec. 14, 1999   (JP) ..................................... 11-354459

(51) Int. Cl.
*H04N 5/225* (2006.01)
*H04M 1/02* (2006.01)
*H04N 7/14* (2006.01)

(52) U.S. Cl.
CPC ............ *H04M 1/021* (2013.01); *H04M 1/0243* (2013.01); *H04M 2250/52* (2013.01); *H04N 5/2258* (2013.01); *H04M 2250/22* (2013.01); *H04M 1/0245* (2013.01); *H04N 5/2251* (2013.01); *H04M 1/0218* (2013.01); *H04N 2007/145* (2013.01)
USPC ....................................... 348/333.06; 348/375

(58) Field of Classification Search
CPC ........................... H04N 5/225; H04N 5/23293
USPC ........... 348/207.99, 373–375, 333.01, 231.99
See application file for complete search history.

(56) References Cited

U.S. PATENT DOCUMENTS 5,359,362 A   10/1994 Lewis et al.
5,675,358 A   10/1997 Bullock et al.
(Continued)

FOREIGN PATENT DOCUMENTS

JP   06-292195 A   10/1994
JP   08-22343 A    1/1996
JP   11-69214 A    3/1999

*Primary Examiner* — Tuan Ho
(74) *Attorney, Agent, or Firm* — Sughrue Mion, PLLC

(57) ABSTRACT

This portable terminal comprises a main unit having a microphone, a key operation unit, and a radio sending/receiving function of image and sound, a
 rotation axial unit having a video camera and an operation dial, an image display unit with a touch panel capable of displaying an image taken by the video camera, a received image and a screen for input operation, and a flip unit having the image display unit, a CCD camera, a speaker and an operation button. The rotation axial unit further includes an opening/shutting axis for connecting the main unit and the flip unit in a mutually rotatable way and a rotation axis for connecting the flip unit in a way of rotating the flip unit across the above
rotation in the horizontal direction, and when the flip unit is opened and rotated across, it is used as a video camera with a monitor.

9 Claims, 11 Drawing Sheets

(56) References Cited

U.S. PATENT DOCUMENTS

| | | |
|---|---|---|
| 5,719,799 A | 2/1998 | Isashi |
| 5,936,610 A | 8/1999 | Endo |
| 5,982,429 A | 11/1999 | Kamamoto et al. |
| 6,069,648 A | 5/2000 | Suso et al. |
| 6,510,325 B1 | 1/2003 | Mack et al. |
| 6,697,117 B1 | 2/2004 | Park |
| 6,750,848 B1 | 6/2004 | Pryor |
| 7,046,287 B2 * | 5/2006 | Nishino et al. ............ 348/333.06 |
| 8,400,531 B2 * | 3/2013 | Solomon ................... 348/231.99 |

* cited by examiner

PORTABLE TERMINAL WITH ROTATABLE AXIAL FLIP UNIT AND DUAL LENS ARRANGEMENT

This application is a Continuation of application Ser. No. 12/349,800 filed Jan. 7, 2009, which is a Continuation of application Ser. No. 11/406,526 filed Apr. 21, 2006, which is a Continuation of application Ser. No. 09/733,984, now U.S. Pat. No. 7,084,919, which claims priority from Japanese Patent Application No. 11-354459 filed on Dec. 14, 1999. The entire disclosures of the prior application Ser. Nos. 12/349,800, 11/406,526, 09/733,984 and 11/354,459 are hereby incorporated by reference.

BACKGROUND OF THE INVENTION

1. Field of the Invention

The present invention relates to a portable terminal, and more particularly to a small-sized portable terminal for compactly realizing various functions of a telephone, a TV telephone, a digital camera, a digital video camera, a pen input terminal and the like.

2. Description of the Related Art

A portable terminal is a small-sized device having a processing function of communication, image and information, convenient to carry and excellent in portability.

As the conventional portable terminal widely used in the public, there are communication terminals and information terminals of, for example, a portable telephone, a PHS, a TV telephone, a digital camera, a digital video camera, and a pen input system.

Recently, a portable terminal provided with some of these functions has made an appearance. In this method, since some functions are provided in one device, it is not necessary to carry several kinds of portable terminals and the portability that is the aim of a portable terminal is improved.

Further, since many units and functions are commonly required in a plurality of portable terminals, when a plurality of functions are provided in one terminal, the common units can be shared and the terminal can be provided with a plurality of functions without losing the characteristic of a light and small portable terminal.

Thus, if a portable terminal provided with a plurality of functions is compared with the method of having individual portable terminals of various functions, it is effective in decreasing the power consumption with superiority in the maintenance and portability, and further decreasing the manufacturing cost and the purchase price since the common unit can be shared.

As an example of the conventional portable terminal with a plurality of functions, there is a technique disclosed in Japanese Patent Publication Laid-Open (Kokai) No. Heisei 06-292195, where a portable terminal, provided with a liquid crystal monitor, a CCD camera, a speaker and a communication function, for realizing functions of a portable telephone and a portable TV telephone is proposed.

A portable TV telephone by the conventional portable terminal including a portable terminal of the Japanese Patent Publication Laid-Open (Kokai) No. Heisei 06-292195 generally adopts a form of setting a CCD camera adjacent to a liquid crystal monitor on the same surface of the liquid crystal monitor of the portable terminal.

Thus, while a user watches a received image displayed on the liquid crystal monitor, the CCD camera set adjacent to the liquid crystal monitor can take an image of the own face to send the same image to a communication party, thereby realizing a function of a portable TV telephone.

Further, a lot of the conventional portable terminals, including the portable terminal of the Japanese Patent Publication Laid-Open (Kokai) No. Heisei 06-292195, adopt a method of providing with a flip unit of the same area as (or a little less than) that of the main unit itself of the portable terminal and connecting both the flip unit and the main unit by a movable axial unit in a way of opening and shutting like a shell. In this case, since the main unit of the portable terminal is supported by hand, generally operation buttons are mainly provided on the main unit and a liquid crystal monitor is provided on the flip unit.

In this form, when the flip unit and the main unit are closed, there is a space in no contact with the outward, inside both the units, where the liquid crystal monitor and various operation buttons can be disposed.

Therefore, by closing it in compact at a time of no use, it is possible to prevent damage to the liquid crystal monitor and a malfunction of the operation buttons, thereby realizing excellent portability.

The conventional portable terminal as mentioned above has the following problems.

First, though there are a lot of advantages in adopting the method of providing one portable terminal with a plurality of functions such as a telephone, a TV telephone, a digital camera, a digital video camera, a pen input terminal and the like, the conventional portable terminal can combine only two or three functions. Especially, it is impossible to realize a portable terminal capable of combining all the abovementioned functions.

This is because if a plurality of functions are provided within one small and light portable terminal, the circuitry and structure of a device becomes too complicated and the operational performance is too deteriorated to solve faults.

Second, though a use of sending various images such as scenes and substances from a visiting place is required as a function of a portable TV telephone, making good use of the portability of the portable terminal, a portable TV telephone by the conventional portable terminal is very inconvenient for picking up an image other than a user's own face.

This is because only one CCD camera is provided adjacent to a liquid crystal monitor on the same surface of the liquid crystal monitor of the main unit in the conventional portable terminal. In order to pick up an image other than a user's own face such as a scene nearby, it is necessary to change the direction of a photographic lens.

If the direction is changed, a user cannot see the display on the liquid crystal monitor. Since the focus of the above-mentioned CCD camera is set at a position near the lens suitable for picking up a face image, in order to pick up a scene nearby, a liquid monitor is necessarily referred to, so as to adjust the focus of the lens.

Third, in the above-mentioned conventional portable terminal where a flip unit is connected to a main unit in a movable way, the main unit and the flip unit are desired to be directed toward the suitable direction for executing various functions, in executing various functions of the portable terminal such as a telephone, a TV telephone, a digital camera, a digital video camera, a pen input terminal and the like. The conventional portable terminal, however, can operate only in a way of opening and closing the flip unit and the main unit, and it cannot be adjusted in the other directions flexibly.

SUMMARY OF THE INVENTION

In order to solve the above conventional problems, a first object of the present invention is to provide a portable terminal having a portable TV telephone, a digital video camera, and a digital still camera, without damaging the portability. Further, it is to provide a portable terminal provided with a touch panel capable of writing with a pen, and provided with full functions as for the data communication as well as the TV telephone.

In order to solve the above conventional problems, a second object of the present invention is to provide a portable terminal provided with a function of a portable TV telephone capable of easily sending an image such as a scene nearby seen from the side of a user, to a communication party.

In order to solve the above conventional problems, a third object of the present invention is to provide a portable terminal capable of changing the direction of main unit and the flip unit to the suitable direction for executing the respective functions flexibly.

According to one aspect of the invention, a portable terminal formed by connecting a main unit and a flip unit having a monitor screen by a rotatable axial unit, comprises
a first photographic lens housed in the axial unit in the longitudinal direction, and
a second photographic lens provided at a predetermined position on the flip unit.

In the preferred construction, the flip unit has the second photographic lens on the side of the monitor screen, and
the axial unit has a structure of closing both the units making inside surface of the main unit into contact with inside surface of the flip unit.

In another preferred construction, the portable terminal further comprises
an axial unit state sensor for detecting angle or positional relationship of the flip unit and the main unit, according to the angle of a movable portion of the axial unit, and
a means for selecting and executing each function predetermined based on the angle or relationship of the flip unit and the main unit detected by the axial unit state sensor, from various usable functions provided in the portable terminal.

In another preferred construction, the portable terminal further comprises
a microphone on the inside of the main unit,
a speaker on the inside of the flip unit,
a communication unit for sound communication, and
a means for putting a communication function through a wireless communication line into an executable state
when the inside surface of the main unit and the inside surface of the flip unit are opened in the same direction.

In another preferred construction, the portable terminal further comprises
a microphone on one surface of the main unit,
a speaker on the outside of the flip unit,
a communication unit for sound communication, and
a means for putting a communication function through a wireless communication line into an executable state
when the surface having the microphone on the main unit and the outside surface of the flip unit are opened in the same direction.

In another preferred construction, the portable terminal further comprises
a microphone on the inside of the main unit,
the communication unit including a communication means of an image, and
a means for putting a communication function of a TV telephone through a wireless communication line into an executable state
when the surface having the microphone on the main unit and the inside surface of the flip unit are opened in the same direction.

In another preferred construction, the portable terminal further comprises
an information processing unit for processing input information and instruction,
the monitor screen that is a monitor with a touch panel, and
a means for putting a function of an information terminal for processing the input information and instruction upon receipt of the input from the touch panel, into an executable state
when the outside surface of the flip unit and one surface of the main unit are closed in contact with each other.

In another preferred construction, the portable terminal further comprises
a storing means for storing electronic data,
a means for converting a static image taken by the first photographic lens and the second photographic lens into electronic data, and
a means for putting a photographic function as a digital camera into an executable state
when the main unit and the flip unit are opened so as to direct the first photographic lens and the second photographic lens in an inverse direction.

In another preferred construction, the portable terminal further comprises
a means for converting a moving image taken by the first photographic lens and the second photographic lens into electronic data, and
a means for putting a photographic function as a digital video camera into an executable state
when the main unit and the flip unit are opened so as to direct the first photographic lens and the second photographic lens in an inverse direction.

In another preferred construction, the portable terminal further comprises
a means for stopping a predetermined function to be finished, of the functions under activation, after judging that the function is in unused state
when the inside surface of the main unit and the inside surface of the flip unit are closed in contact with each other.

In another preferred construction, the portable terminal further comprises
a storing means for storing electronic data.

In another preferred construction, the portable terminal further comprises
a means for converting a static image taken by the first photographic lens and the second photographic lens into electronic data,
the portable terminal storing the taken static image in the storing means as a digital camera.

In another preferred construction, the portable terminal further comprises
a means for converting a moving image taken by the first photographic lens and the second photographic lens into electronic data,
the portable terminal storing the taken moving image in the storing means as a digital video camera.

In another preferred construction, the portable terminal further comprises
a communication unit for image and sound communication, and
a means for transmitting images taken by the first photographic lens and the second photographic lens through the communication unit.

In another preferred construction, the main unit is provided with the microphone, the flip unit is provided with the speaker, and communication through a wireless communication line is performed by the communication unit.

In another preferred construction, the portable terminal further comprises a mans for displaying the image received by the communication unit on the monitor screen, reproducing the sound received by the communication unit through the speaker, and transmitting the images taken by the first photographic lens and the second photographic lens and the sound supplied to the microphone, to a communication party, in which communication by a TV telephone is performed by the communication unit.

In another preferred construction, the portable terminal further comprises an information processing unit for processing input information and instruction, the monitor screen that is a monitor with a touch panel, and a means for receiving input from the touch panel and processing the input information and instruction.

In another preferred construction, input with an input pen on the monitor screen that is the touch panel monitor is accepted.

In another preferred construction, the portable terminal further comprises an operation button for specifying the type of an image to be displayed on the monitor screen, to a control unit, in which the type of an image to be displayed on the monitor screen is switched according to the specification by the operation button.

In another preferred construction, the portable terminal further comprises a means for displaying an image taken by the first photographic lens on the monitor screen, a means for displaying an image taken by the second photographic lens on the monitor screen, and a means for displaying the image taken by the first photographic lens and the image taken by the second photographic lens simultaneously on the monitor screen at predetermined respective portions, in which the type of an image to be displayed on the monitor screen is switched according to the specification by the operation button.

In another preferred construction, the portable terminal further comprises an input/output unit for performing communication by electric signals through connection to an outward information device, in which bidirectional data transfer is performed with the outward information device through the input/output unit.

In another preferred construction, the portable terminal further comprises a sound input/output terminal for sending and receiving a sound signal.

In another preferred construction, the axial unit connects a central portion of one side of the flip unit to a central portion of one side of the main unit in a movable way, and includes an opening/shutting axis for connecting both the flip unit and the main unit in a way of freely opening and closing around the connected one side, and a rotation axis for connecting the flip unit in a way of freely rotating across around the opening/shutting axis.

According to another aspect of the invention, a portable terminal formed by connecting a main unit and a flip unit having a monitor screen by a rotatable axial unit, comprises a first photographic lens in the vicinity of the axial unit, and a second photographic lens provided at a predetermined position on the flip unit.

In the preferred construction, the flip unit has the second photographic lens on the side of the monitor screen, and the axial unit has a structure of closing both the units making inside surface of the main unit into contact with inside surface of the flip unit.

In another preferred construction, the portable terminal further comprises an axial unit state sensor for detecting angle or positional relationship of the flip unit and the main unit, according to the angle of a movable portion of the axial unit, and a means for selecting and executing each function predetermined based on the angle or relationship of the flip unit and the main unit detected by the axial unit state sensor, from various usable functions provided in the portable terminal.

In another preferred construction, the portable terminal further comprises a microphone on the inside of the main unit, a speaker on the inside of the flip unit, a communication unit for sound communication, and a means for putting a communication function through a wireless communication line into an executable state inside surface of the flip unit are opened in the same direction.

In another preferred construction, the portable terminal further comprises a microphone on one surface of the main unit, a speaker on the outside of the flip unit, a communication unit for sound communication, and a means for putting a communication function through a wireless communication line into an executable state when the surface having the microphone on the main unit and the outside surface of the flip unit are opened in the same direction.

In another preferred construction, the portable terminal further comprises a microphone on the inside of the main unit, the communication unit including a communication means of an image, and a means for putting a communication function of a TV telephone through a wireless communication line into an executable state when the surface having the microphone on the main unit and the inside surface of the flip unit are opened in the same direction.

In another preferred construction, the portable terminal further comprises an information processing unit for processing input information and instruction, the monitor screen that is a monitor with a touch panel, and a means for putting a function of an information terminal for processing the input information and instruction upon receipt of the input from the touch panel, into an executable state when the outside surface of the flip unit and one surface of the main unit are closed in contact with each other.

In another preferred construction, the portable terminal further comprises a storing means for storing electronic data, a means for converting a static image taken by the first photographic lens and the second photographic lens into electronic data, and a means for putting a photographic function as a digital camera into an executable state when the main unit and the flip unit are opened so as to direct the first photographic lens and the second photographic lens in an inverse direction.

In another preferred construction, the portable terminal further comprises a means for converting a moving image taken by the first photographic lens and the second photographic lens into electronic data, and a means for putting a photographic function as a digital video camera into an executable state when the main unit and the flip unit are opened so as to direct the first photographic lens and the second photographic lens in an inverse direction.

In another preferred construction, the portable terminal further comprises a means for stopping a predetermined function to be finished, of the functions under activation, after judging that the function is in unused state when the inside surface of the main unit and the inside surface of the flip unit are closed in contact with each other.

In another preferred construction, the portable terminal further comprises a storing means for storing electronic data.

In another preferred construction, the portable terminal further comprises a means for converting a static image taken by the first photographic lens and the second photographic lens into electronic data, the portable terminal storing the taken static image in the storing means as a digital video camera.

In another preferred construction, the portable terminal further comprises a means for converting a moving image taken by the first photographic lens and the second photographic lens into electronic data, the portable terminal storing the taken moving image in the storing means as a digital video camera.

In another preferred construction, the portable terminal further comprises a communication unit for image and sound communication, and a means for transmitting images taken by the first photographic lens and the second photographic lens through the communication unit.

In another preferred construction, the main unit is provided with the microphone, the flip unit is provided with the speaker, and communication through a wireless communication line is performed by the communication unit.

In another preferred construction, the portable terminal further comprises a mans for displaying the image received by the communication unit on the monitor screen, reproducing the sound received by the communication unit through the speaker, and transmitting the image taken by the first photographic lens and the second photographic lens and the sound supplied to the microphone, to a communication party, in which communication by a TV telephone is performed by the communication unit.

In another preferred construction, the portable terminal further comprises an information processing unit for processing input information and instruction, the monitor screen that is a monitor with a touch panel, and a means for receiving input from the touch panel and processing the input information and instruction.

In another preferred construction, input with an input pen on the monitor screen that is the touch panel monitor is accepted.

In another preferred construction, the portable terminal further comprises an operation button for specifying the type of an image to be displayed on the monitor screen, to a control unit, in which the type of an image to be displayed on the monitor screen is switched according to the specification by the operation button.

In another preferred construction, the portable terminal further comprises a means for displaying an image taken by the first photographic lens on the monitor screen, a means for displaying an image taken by the second photographic lens on the monitor screen, and a means for displaying the image taken by the first photographic lens and the image taken by the second photographic lens simultaneously on the monitor screen at predetermined respective portions, in which the type of an image to be displayed on the monitor screen is switched according to the specification by the operation button.

In another preferred construction, the portable terminal further comprises an input/output unit for performing communication by electric signals through connection to an outward information device, in which bidirectional data transfer is performed with the outward information device through the input/output unit.

In another preferred construction, the portable terminal further comprises a sound input/output terminal for sending and receiving a sound signal.

In another preferred construction, the axial unit connects a central portion of one side of the flip unit to a central portion of one side of the main unit in a movable way, and includes an opening/shutting axis for connecting both the flip unit and the main unit in a way of freely opening and closing around the connected one side, and a rotation axis for connecting the flip unit in a way of freely rotating across around the opening/shutting axis.

Other objects, features and advantages of the present invention will become clear from the detailed description given herebelow.

BRIEF DESCRIPTION OF THE DRAWINGS

The present invention will be understood more fully from the detailed description given here below and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

FIGS. 1 to 12 are views each showing a main unit and a flip unit of a portable terminal according to a first embodiment of the present invention, which are put in various directions and seen from various directions.

With reference to FIGS. 1 to 12, in the portable terminal of the embodiment of the present invention, a main unit 10 and a flip unit 20 are connected in a movable way through an axial unit 30.

Figure 1:
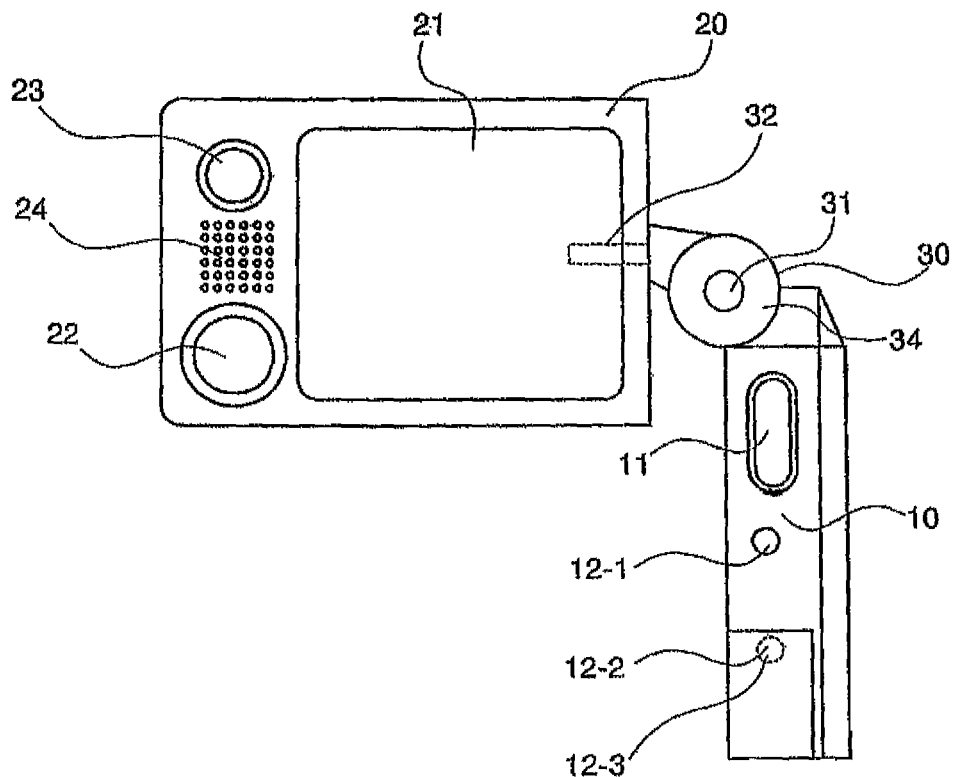
FIG. 1 is a front view showing the case of using the functions of a video camera, a digital still camera and a TV telephone in a portable terminal according to a first embodiment of the present invention.

The axial unit 30 is provided with an opening/shutting axis 31 and a rotation axis 32 as illustrated in FIG. 1. The opening/shutting axis 31 is connected to the portable terminal so that the main unit and the flip unit can be relatively rotatable, and the rotation axis 32 is connected there in a rotatable way in the vertical direction across the rotation of the opening/shutting axis 31.

Further, a first photographic lens 33 for a digital camera is provided on one end of the opening/shutting axis 31 and an operation dial 34 is provided on the other end thereof.

The flip unit 20 is inside provided with a monitor with a touch panel 21, an operation button 22 for switching a screen, a second photographic lens 23 for a TV telephone and a speaker phone 24 as illustrated in FIG. 1.

Figure 2:
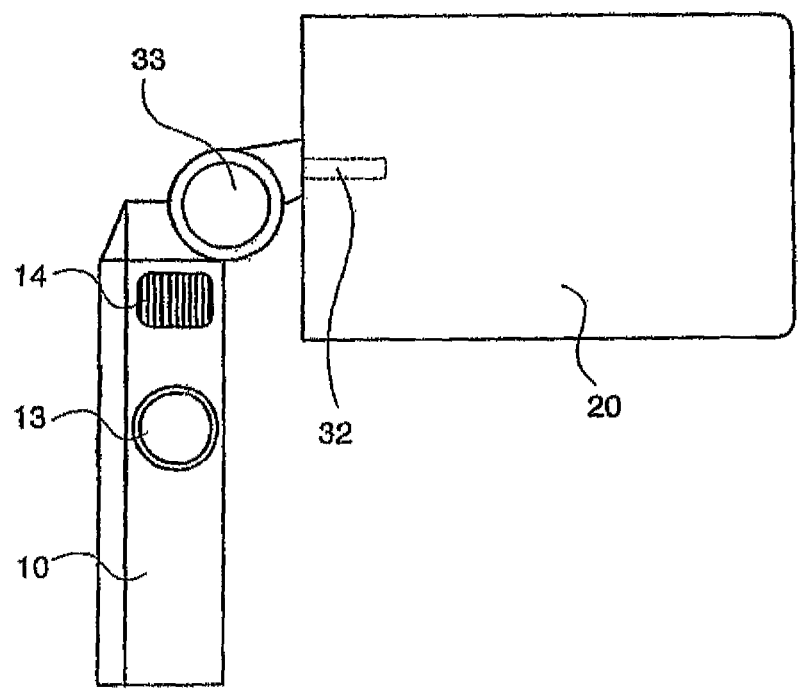
FIG. 2 is a rear elevation view of the portable terminal of FIG. 1 according to the first embodiment of the present invention.
Figure 9:
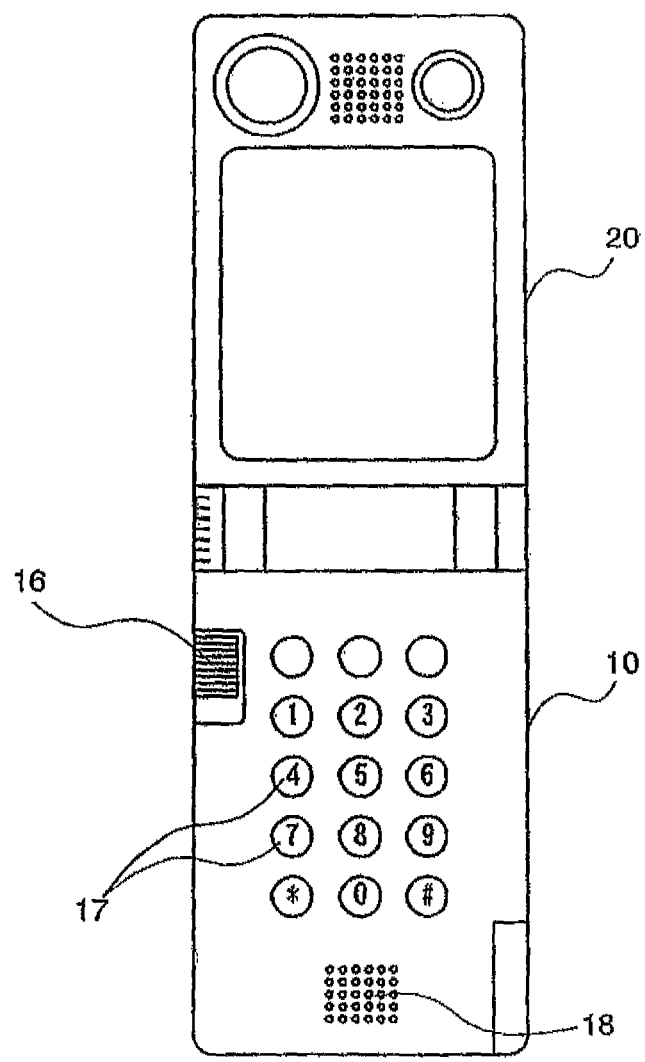
FIG. 9 is a front view showing the state of opening the operation key of the main unit and the monitor with a touch panel on the flip unit in the same direction, in the portable terminal according to the first embodiment of the present invention.

The main unit 10 of the terminal is inside provided with an operation key 17 for inputting a telephone number, a moving image/static image switch 16 for switching the kind of an image to be taken and a microphone 18 as illustrated in FIG. 9. Further it is provided with a strobe 14 and a button 13 for taking an image on one side thereof as illustrated in FIG. 2, and it is provided with a zoom button 11, a data input/output terminal 12-2, a dummy plug for data input/output terminal 12-3, and a sound input/output terminal 12-1 on the other side thereof as illustrated in FIG. 1.

Further, the main unit 10 is provided with an input pen storing unit 19 for storing an input pen 40 used at a time of pen input.

Figure 13:
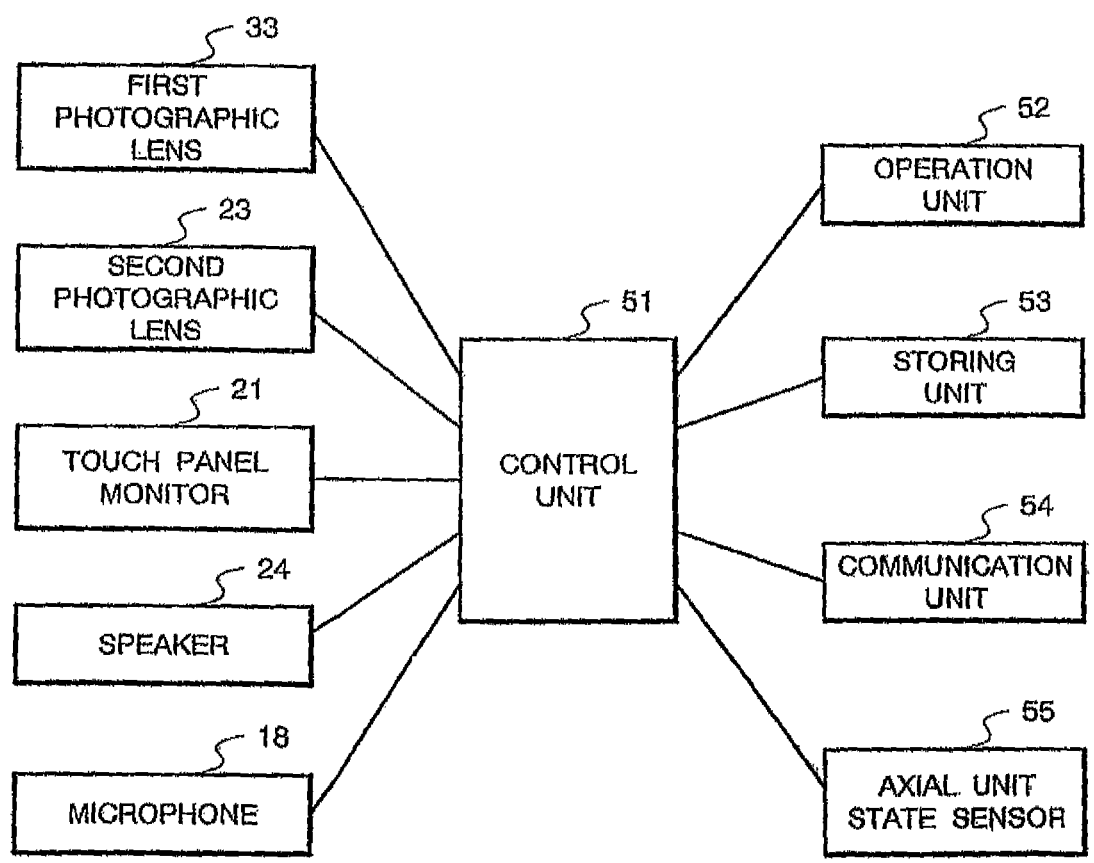
FIG. 13 is a block diagram showing the internal structure of the portable terminal according to the first embodiment of the present invention.

FIG. 13 is a block diagram showing the internal structure of the portable terminal of this embodiment.

With reference to FIG. 13, the portable terminal of this embodiment comprises a first photographic lens 33, a second photographic lens 23, a monitor with a touch panel 21, a speaker 24, a microphone 18, an operation unit 52 for a user performing various operations, a storing unit 53 for storing the taken picture, a communication unit 54 for wireless communication, etc. and an axial unit state sensor 55 for examining the state of the axial unit 30 to detect the directions of the main unit 10 and the flip unit 20, which are respectively controlled by a control unit 51.

The portable terminal of the embodiment performs various functions of a telephone, a TV telephone, a digital camera, a digital video camera, a pen input terminal and the like, by directing the main unit 10 and the flip unit 20 in the suitable direction for the respective functions.

This time, an example of using these functions of the portable terminal of the embodiment in the suitable directions of the main unit 10 and the flip unit 20 for the respective functions will be described in detail with reference to the drawings.

FIGS. 4 to 8 are views showing the state of folding the portable terminal of the embodiment when it is not used.

When it is not used, the main unit 10 and the flip unit 20 are folded around the opening/shutting axis 31 as illustrated in FIGS. 4 to 8. The touch panel monitor 21 of the flip unit 20 and the operation key 17 of the main unit 10 are thus closed inwardly, with no contact with the outside, thereby preventing damage to the touch panel monitor 21 and a malfunction of the operation key 17, with excellent portability.

Figure 3:
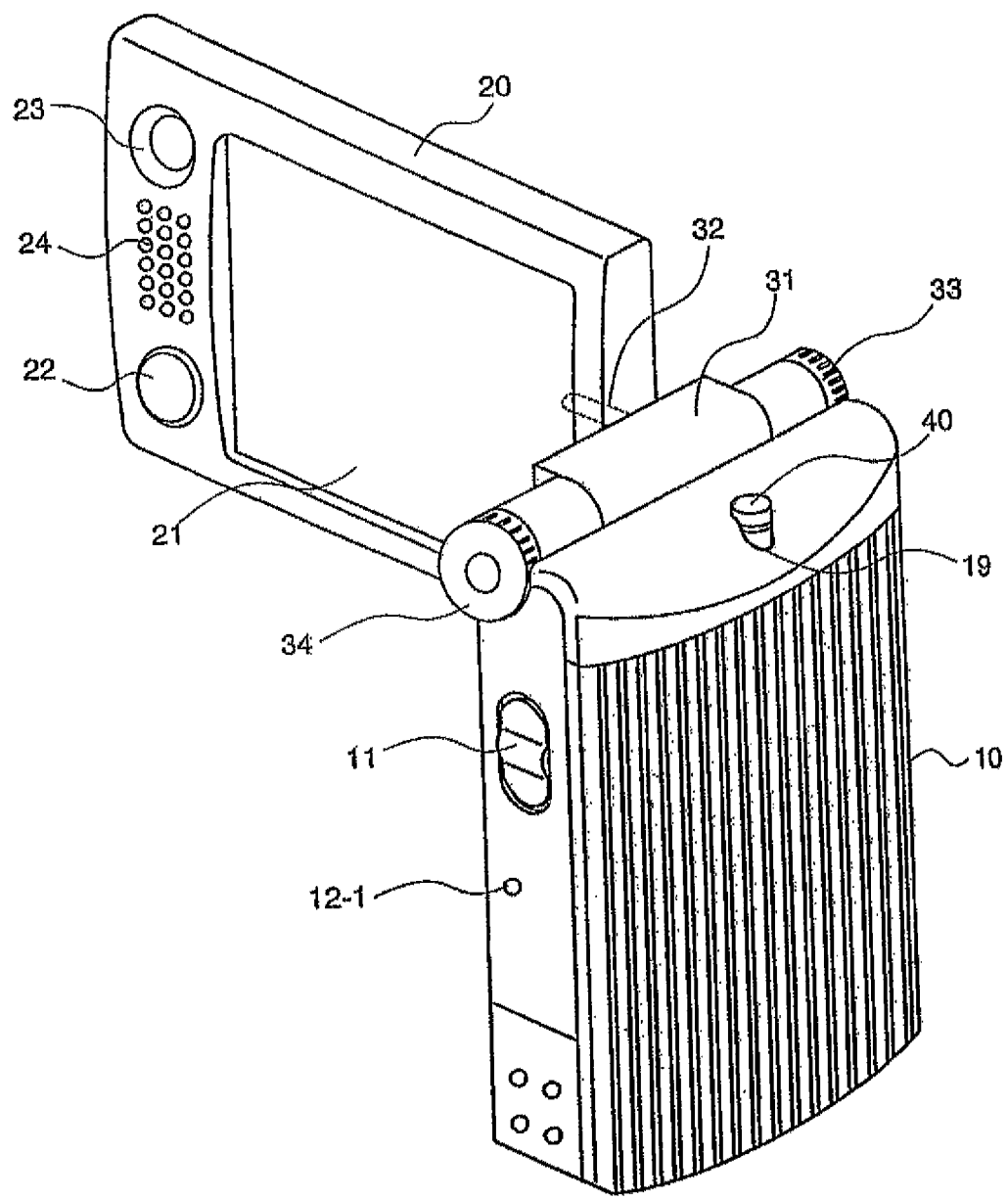
FIG. 3 is a perspective view of the portable terminal of FIG. 1 according to the first embodiment of the present invention.
Figure 4:
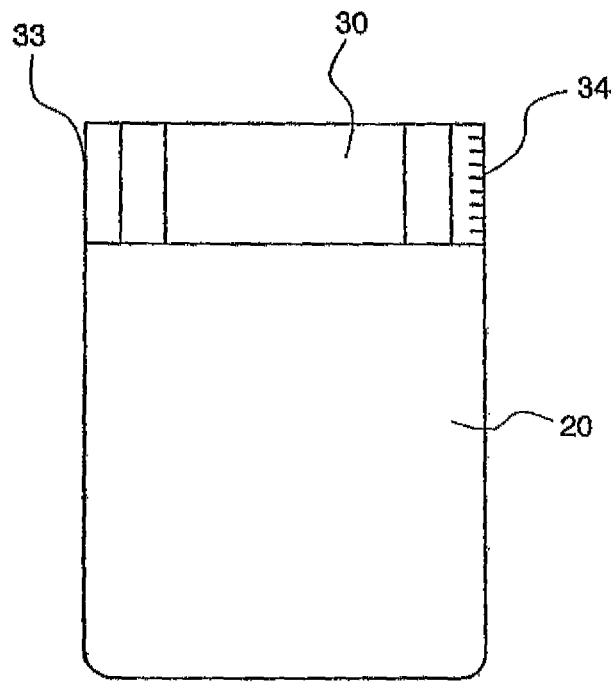
FIG. 4 is a front view from the side of a flip unit, showing the state of inwardly closing an operation key and a monitor with a touch panel of the portable terminal according to the first embodiment of the present invention.
Figure 5:
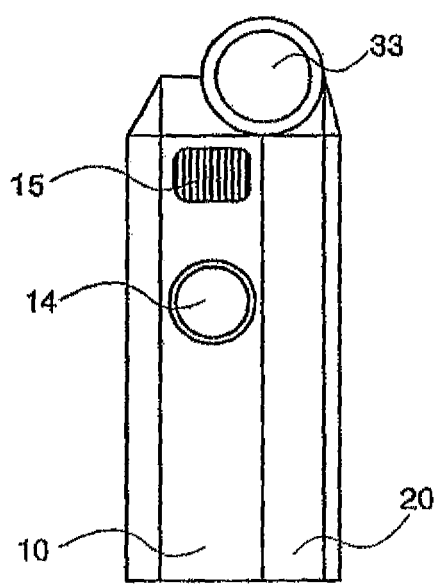
FIG. 5 is a side elevation view from the side of a photographic lens, in the portable terminal of FIG. 4 according to the first embodiment of the present invention.
Figure 6:
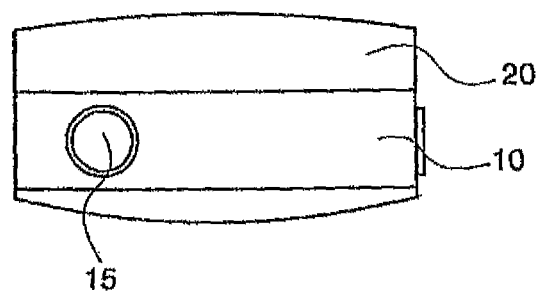
FIG. 6 is a bottom view of the portable terminal of FIG. 4 according to the first embodiment of the present invention.
Figure 7:
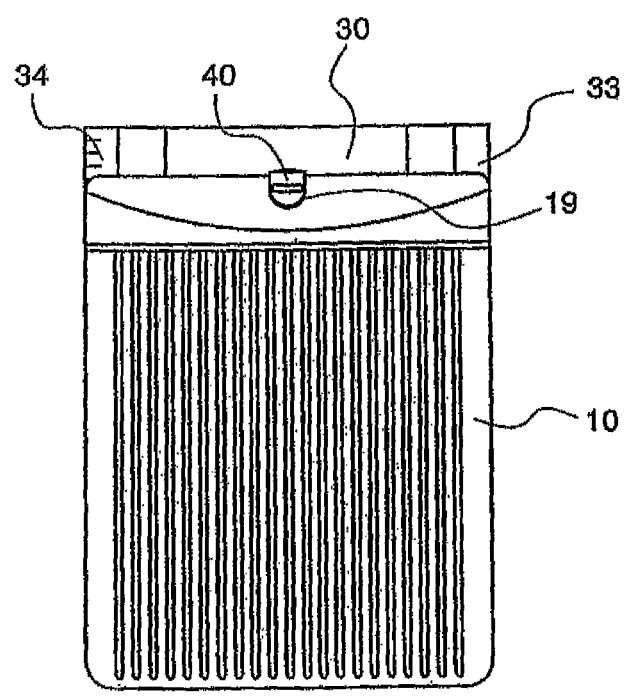
FIG. 7 is a rear elevation view from the side of the main unit in the portable terminal of FIG. 4 according to the first embodiment of the present invention.
Figure 8:
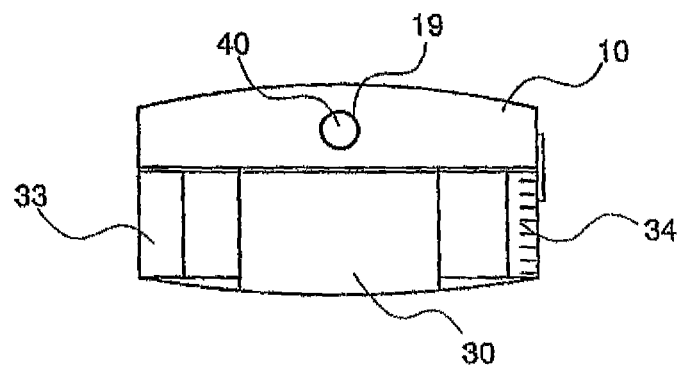
FIG. 8 is a plan view from the side of the top in the portable terminal of FIG. 4 according to the first embodiment of the present invention.

In the case of using it as a TV telephone, the main unit 10 and the flip unit 20 are opened to a position of turning them to an L-shape around the opening/shutting axis 31, and then, the flip unit 20 is turned across at 90° in the horizontal direction, as illustrated in FIGS. 1, 2 and 3.

A phone call is made by using the operation key 17 in the same way as the ordinal portable telephone. Conversation is made through the speaker phone 24. It is also possible to use the portable terminal by connecting a microphone or a headphone to the sound input/output terminal 12-1.

It is possible to operate the operation button 22 at use so to variously switch a screen to be displayed on the touch panel monitor 21. The screen on the touch panel monitor 21 can show not only an image of a communication party transmitted through the communication of the TV telephone, but also an image of a user's own face taken by the second photographic lens 23 that is transmitted from the user's side to the communication party or an image of scene and substance around the user that is taken by the first photographic lens 33. Further a form of displaying the above images at once is possible.

More specifically, three kinds of images; a communication party's image, a user's image and an image before the user' eyes may be switched variously, or combined.

As a form of displaying them, there may be considered a first form of displaying one of these images on the whole screen of the touch panel monitor 21, a second form of displaying two of them on each half screen of the touch panel monitor 21, a third form of displaying these three images on each one-third screen of the touch panel monitor 21, and a fourth form of displaying one of them on the whole screen of the touch panel monitor 21 and further displaying the other (one or two of them) small with it overlapped on the screen as a child screen.

In the fourth displaying form, the display position of the child screen may be decided in advance, or the display position and the size may be specified by the input pen 40 on the touch panel monitor 21 and after display, it can be changed to any desired position and size, or by the operation of the operation button 22, a desired one may be selected and displayed from the predetermined setting of a plurality of display positions.

Similarly to the selection of an image to be displayed on the touch panel monitor 21, an image to transmit to a communication party can be also selected variously by the operation of the above operation button 22.

Although the TV telephone generally transmits a user's own face taken by the second photographic lens 23 to a communication party, the portable terminal of the present invention can switch the image to transmit to an image of the scene or substance before the user's eyes taken by the first photographic lens 33, or transmit the combined image, associated with or independently of the selection of the image to be displayed on the touch panel monitor 21.

As mentioned above, since it is possible to transmit an image including the scene before a user's eyes as well as the user's face while switching the image at ease, the function of the TV telephone according to the portable terminal of the embodiment is very convenient for transmission of the scene at a visiting place or the like and it is to make the best use of the portability of a portable terminal.

In the above-mentioned form, although the image of the scene before a user's eyes is transmitted, a form of transmitting only the user's face is possible. In this case, the main unit 10 and the flip unit 20 are only opened to a position of becoming a shape of L around the opening/shutting axis 31, with no need to rotate across the flip unit 20 at 90° in the horizontal direction.

Next, in the case of using it as a digital video camera, it is preferable to use the main unit 10 and the flip unit 20 in the same direction as in the case of the above-mentioned TV telephone as shown in FIGS. 1 to 3.

A user sets the moving image/static image switch 16 shown in FIG. 9 for the moving image, thereby deciding on the moving image as for the kind of the image to be taken by the first photographic lens 33. The size of the image to be taken is adjusted by using the zoom button 11 with reference to the touch panel monitor 21. Press of the button 13 for taking an image starts taking and the moving image taken by the first photographic lens 33 is converted into electronic data and stored in the storing unit 53.

The storing unit 53 stores the electronic data of the image into a built-in semiconductor memory, which can be read out and reproduced on the touch panel monitor 21 at any time. When the stored data is transmitted to an outside information processing terminal of a personal computer, the dummy plug for data input/output terminal 12-3 is extracted from the data input/output terminal 12-2 shown in FIG. 1 and instead of it, a connection cable is inserted therein. The other end of the connection cable is connected to the information processing terminal, thereby enabling data input/output.

Also it is possible to take an image in the state of fixing the portable terminal to a tripod by use of a 20 tripod fixing hole 15.

Similarly, in the case of using it as a digital still camera, it is preferable to use the main unit 10 and the flip unit 20 in the same direction as in the above-mentioned TV telephone as shown in FIGS. 1 to 3.

A user sets the moving image/static image switch 16 shown in FIG. 9 for the static image, thereby deciding on the static image as for the kind of the image to be taken by the first photographic lens 33. The size of the image to be taken is adjusted by using the zoom button 11 with reference to the touch panel monitor 21. Press of the button 13 for taking an image starts taking and the static image taken by the first photographic lens 33 is converted into electronic data and stored in the storing unit 53.

In this case, the button 13 for taking an image takes a role of a shutter and by using this button an image is taken. Thus taken image is stored in the storing unit 53 and it can be read out and reproduced any time.

Also it is possible to take an image in the state of fixing the portable terminal to a tripod by use of a 15 tripod fixing hole 15.

Figure 10:
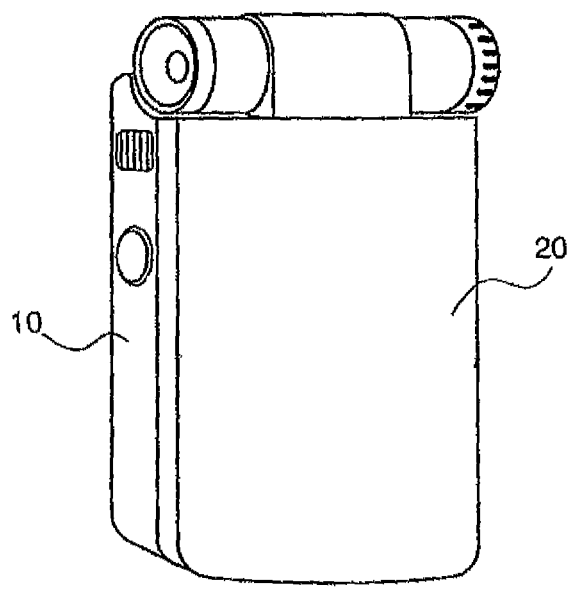
FIG. 10 is a perspective view showing the state of inwardly closing the operation key and the monitor with a touch panel in the portable terminal according to the first embodiment of the present invention.
Figure 11:
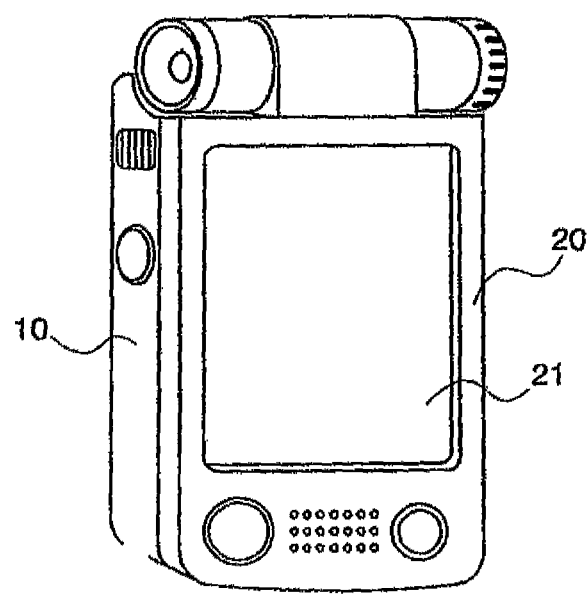
FIG. 11 is a perspective view showing the state of inwardly closing the face of the operation key of the main unit and the face of the liquid crystal monitor of the flip unit, in the portable terminal according to the first embodiment of the present invention.

In the case of using it as a pen input terminal, it is used in the state of closing the main unit 10 and the flip unit 20, making the inside surface of the main unit 10 into contact with the outside surface of the flip unit 20 as illustrated in FIG. 11. From the ordinary close state as shown in FIG. 10, once opening the main unit 10 and the flip unit 20 to any position around the opening/shutting axis 31, only the flip unit 20 is rotated across around the rotation axis 32 at 180° in the horizontal direction and the flip unit 20 is again combined with the main unit 10 around the opening/shutting axis 31, to be shown in the state of FIG. 11.

Figure 12:
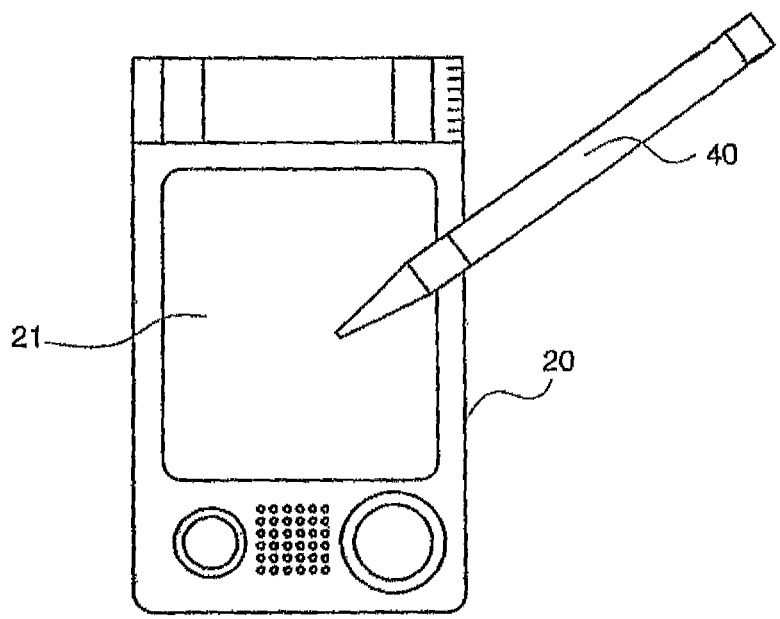
FIG. 12 is a front view showing the case of using a function of pen input, in the portable terminal according to the first embodiment of the present invention.

Thus, it becomes possible to input various data and instructions with the input pen 40 on the touch panel monitor 21 of the flip unit 20 as illustrated in FIG. 12. Since the portable terminal is closed small with the touch panel monitor 21 fixed outward, it is possible to support the portable terminal by the main unit 10 by hands so as not to wobble the touch panel monitor 21 at the input time with the input pen 40.

Alternatively, it may be used in the state of closing the both, making the outside surface of the main unit 10 into contact with the outside surface of the flip unit 20. The main unit 10 and the flip unit 20 are opened around the opening/shutting axis 31 at 360° from the state as shown in FIG. 10, and then the outside of the main unit 10 is combined with the outside of the flip unit 20.

In the case of using it as the ordinary portable telephone, the main unit 10 and the flip unit 20 are opened around the opening/shutting axis 31 to any position as illustrated in FIG. 9, thereby enabling the communication. A telephone number is input with the operation key 17 in the same way as in the case of the TV telephone, a voice is supplied through the microphone 18 and the received voice is reproduced by the speaker 24.

As mentioned above, the portable terminal of the embodiment can realize a lot of functions of a telephone, a TV telephone, a digital camera, a digital video camera, a pen input terminal and the like, in compact.

This time, a portable terminal according to a second embodiment of the present invention will be described.

In the second embodiment, activation of various functions provided in the portable terminal of the present invention is controlled depending on the relative direction of the main unit 10 and the flip unit 20.

When the relative direction of the main unit 10 and the flip unit 20 suitable for each function described in the first embodiment is detected by the axial unit state sensor 55, the corresponding function is activated or it is ready for activation.

Figure 14:
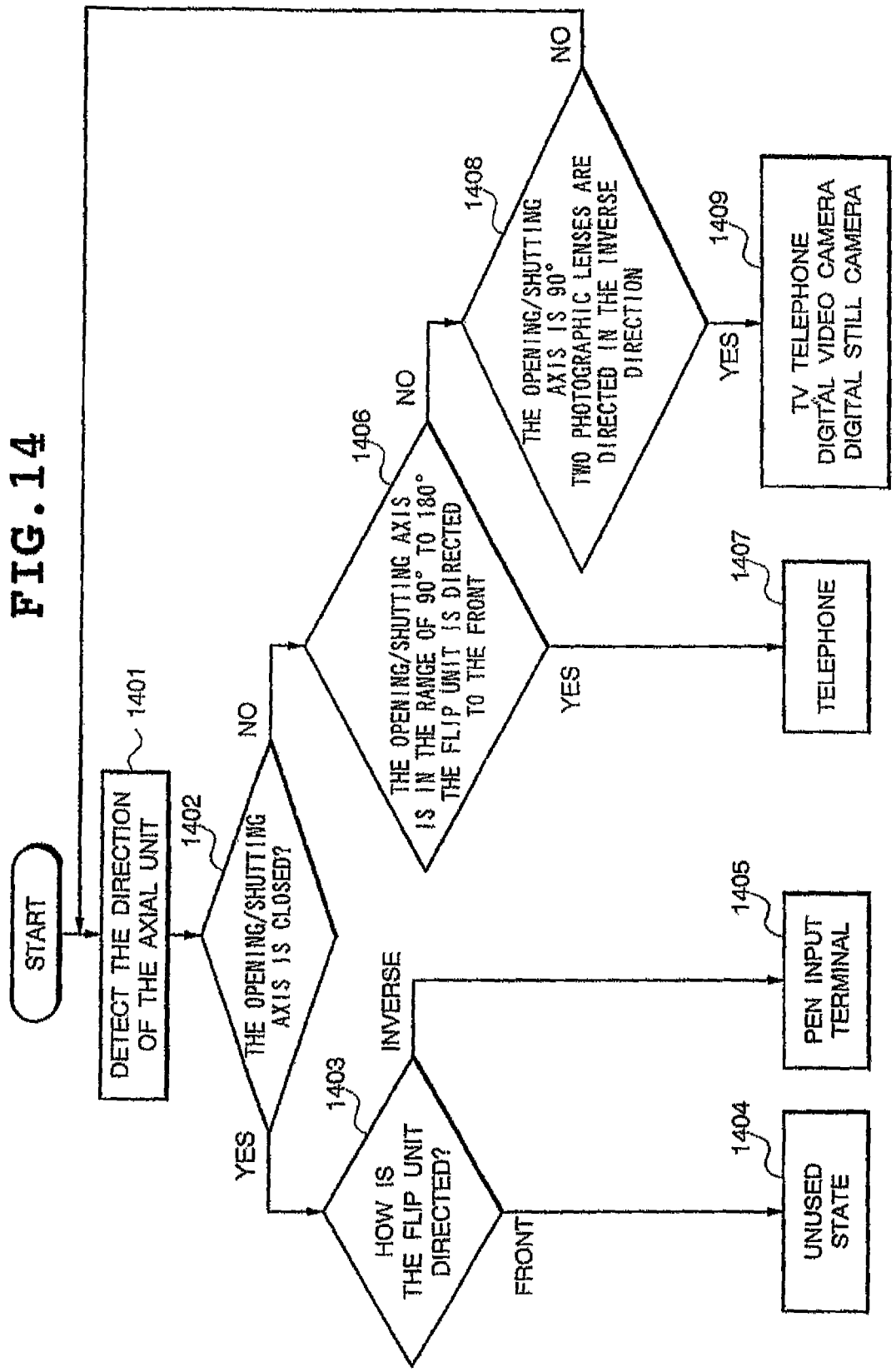
FIG. 14 is a flow chart for use in describing the processing of the portable terminal according to a second embodiment of the present invention.

FIG. 14 is a flow chart for use in describing the control of the portable terminal of this embodiment.

With reference to FIG. 14, the axial unit state sensor 55 detects the respective angles of the opening/shutting axis 31 and the rotation axis 32 of the axial unit 30 in order to recognize the relative direction of the main unit 10 and the flip unit 20 (Step 1401).

When the opening/shutting axis 31 is closed (Step 1402) and the rotation axis 32 has no rotation (namely, the flip unit 20 is directed to the front direction) (Step 1403), the axial unit state sensor 55 detects that the main unit 10 and the flip unit 20 are inwardly closed in an unused state at present (Step 1404). Because of the unused state, the processing of automatically cutting off the power supply is performed if necessary.

When the opening/shutting axis 31 is closed (Step 1402) and the direction of the rotation axis 32 is rotated at 180° (namely, the flip unit is directed to the inverse direction) (Step 1403), the axial unit state sensor 55 detects that the both units are closed by making the inside of the main unit 10 face to face with the outside of the flip unit 20 in a state of using a function of pen input terminal (Step 1405).

When the opening/shutting axis 31 is opened (Step 1402), the angle of the opening/shutting axis 31 is in the range of 90° to 180°, and the rotation axis 32 has no rotation (Step 1406), the sensor 55 detects that it is the case of using a telephone function (Step 1407).

When the opening/shutting axis 31 is opened (Step 1402), the angle of the opening/shutting axis 31 is 90°, the rotation axis 32 is rotated at 90°, and the first photographic lens 33 and the second photographic lens 23 are directed in the inverse direction (Step 1408), it detects that it is the case of using one of the functions of a TV telephone, a digital video camera and a digital still camera (Step 1409). Which function is to be executed can be decided by a user's operation specifying it or a predetermined initial setting.

When it is in none of the above cases (Step 1408), this step is returned to Step 1401, where the sensor 55 waits for the relative direction of the main unit 10 and the flip unit 20 to become the direction corresponding to one of the functions.

When the current function to be used is recognized in Steps 1405, 1407, 1409 and the like, the corresponding function is activated or it is ready for activation if necessary in the case where the corresponding function is not yet activated. When the other function is under activation, the recognized function is activated, the function under activation is finished, and the switching processing for activating the newly recognized function can be performed.

In addition to the effect of the first embodiment, the portable terminal of this embodiment as mentioned above can perform automatic activation of each function provided in the portable terminal, in accordance with the relative direction of the main unit 10 and the flip unit 20, thereby activating or switching various functions at ease.

A portable terminal of a third embodiment of the 25 present invention will be described.

Figure 15:
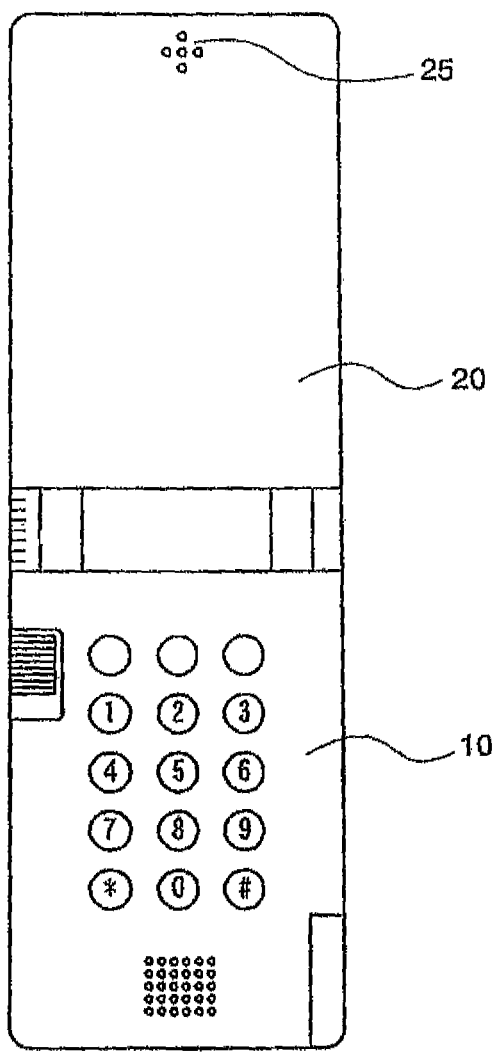
FIG. 15 is a front view showing the state of opening the speaker of the flip unit and the operation key of the main unit in the same direction, in the portable terminal according to a third embodiment of the present invention.
Figure 16:
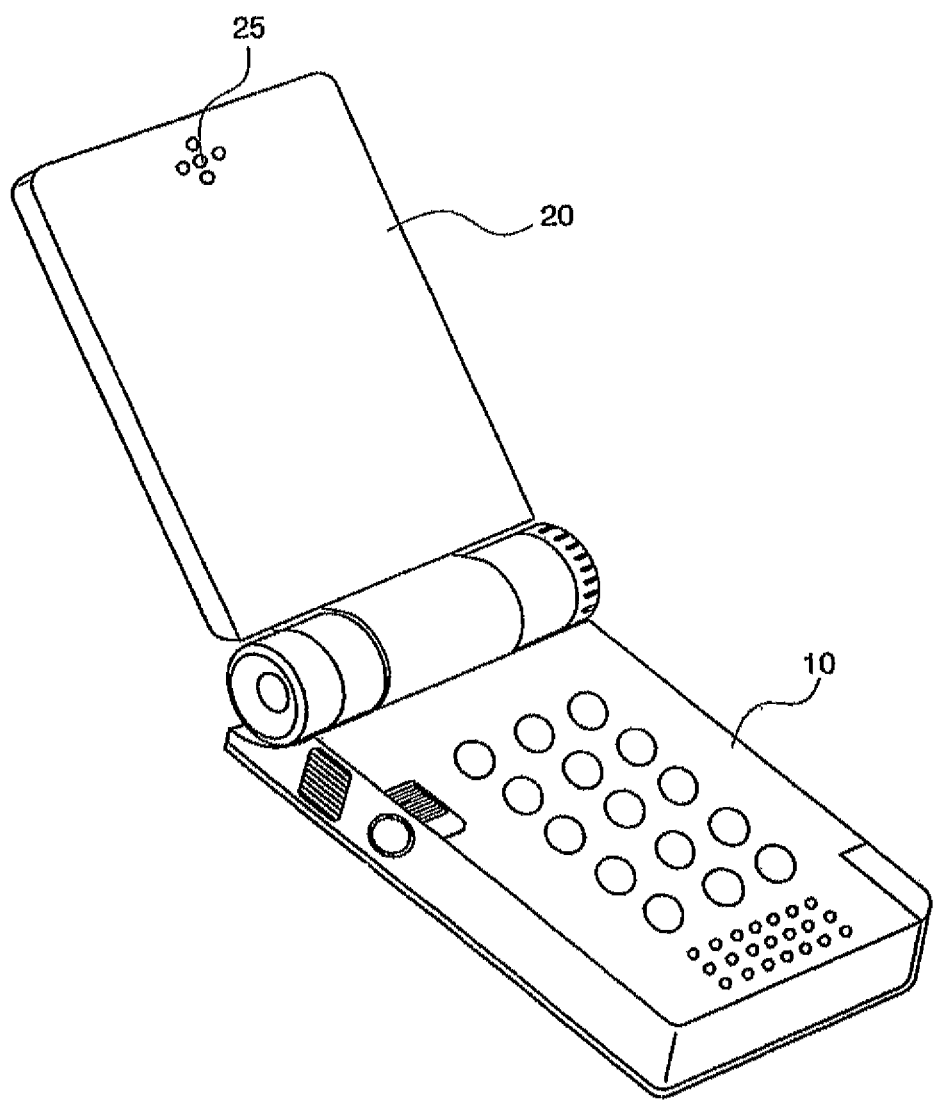
FIG. 16 is a front view showing the case of using a function of a portable telephone, in the portable terminal according to the third embodiment of the present invention.

The portable terminal of the third embodiment of the present invention is different from the first embodiment and the second embodiment in that a second speaker 25 is provided on the opposite side of the speaker phone 24 in the flip unit 20 as illustrated in FIGS. 15 and 16. Accordingly, in the case of using it as a portable telephone, it can be used with the outside of the flip unit facing to the inside of the main unit, by turning the flip unit 20 around the rotation axis 32 at 180°. In this case, a user's cheek doesn't come into contact with the touch panel monitor 21 when using it as the ordinal portable telephone, thereby enabling conversation without dirtying the surface of the monitor.

A combination of the second embodiment and the third embodiment is enabled by replacing Step 1406 with the phrase "the angle of the opening/shutting axis is in the range of 90° to 180° and the rotation axis is inversely rotated at 180°".

The other embodiment of the present invention will be described this time.

A portable terminal provided with some of the 20 functions or less than the functions; a telephone, a TV telephone, a digital camera, a digital video camera and a pen input terminal, as described in the above embodiments, is possible, other than the portable terminal provided with all the above-mentioned functions.

Further, a portable terminal further provided with a receiving function of radio waves or TV waves, a beeper function, a navigation system such as a car navigation and the like is also possible. Also in the case of providing with these functions, a lot of units and functions can be used in common, thereby adding the functions efficiently.

The storing unit 53 may be realized by a drive for storing data into a semiconductor memory or a magnetic memory that is a removable storing medium, instead of the form of using a built-in semiconductor memory as described in the above embodiments.

In the case of using the built-in semiconductor memory in the storing unit 53, it is possible to perform data exchange to the outward information terminal by the infrared communication, other than the form of using the data input/output terminal 12-2 and the connection cable.

As set forth hereinabove, the present invention has the following excellent effects.

As a first effect, in the case of using the portable terminal as a TV telephone, it is possible to transmit a user's own face and the scene of the user's view to a communication party at ease and at once. This is because the portable terminal of the present invention is provided with two photographic lenses and a switch, thereby to transmit the images at an easy operation.

As a second effect, it is possible to provide a portable terminal capable of various operations of a moving image, a static image, a character mail, a portable telephone and the like. This is because it is provided with two rotation axes capable of setting any angle, thereby to cope with various uses.

As a third effect, it is possible to transfer the taken image to an information processor such as a personal computer at ease or to transfer the image from the personal computer to the side of a portable terminal. This is because it is provided with a data input/output interface, thereby enabling connection to the other device at ease without passing through the storing medium such as a memory card.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A portable terminal comprising:
   a main unit
   a flip unit having a monitor screen connected with said main unit;
   a first photographic lens provided at a predetermined position in an axial unit; and
   a second photographic lens provided at a predetermined position on the same side with said monitor screen;
   wherein said first photographic lens takes an image of a different direction from a direction from which said second photographic lens takes an image; and
   wherein said images taken by said first and second photographic lenses are displayed on said monitor screen;
   wherein said axial until has a structure of closing both units making inside surface of the main unit into contact with inside surface of the flip unit.

2. A portable terminal as set forth in claim 1, further comprising:
   and axial unit state sensor for detecting angle or positional relationship of the flip unit and the main unit, according to the angle of a movable portion of the axial unit; and
   a means for selecting and executing each function predetermined based on the angle or relationship of the flip unit and the main unit detected by said axial unit state sensor, from various usable functions provided in the portable terminal.

3. A portable terminal as set forth in claim 2, further comprising:
   a microphone on the inside of the main unit;
   a speaker on the inside of the flip unit;
   a communication unit for sound communication; and
   a means for putting a communication function through a wireless communication line into an executable state when the inside surface of the main unit and the inside surface of the flip unit are opened in the same direction.

4. A portable terminal as set forth in claim 2, further comprising:
   a microphone on one surface of the main unit;
   a speaker on the outside of the flip unit;
   a communication unit for sound communication; and
   a means for putting a communication function through a wireless communication line into an executable state when the surface having said microphone on the main unit and the outside surface of the flip unit are opened in the same direction.

5. A portable terminal as set forth in claim 3, further comprising:
   a microphone on the inside of the main unit;
   said communication unit including a communication means of an image; and
   a means for putting a communication function of a TV telephone through a wireless communication line into an executable state when the surface having said microphone on the main unit and the inside surface of the flip unit are opened in the same direction.

6. A portable terminal as set forth in claim 2, further comprising:
   an information processing unit for processing input information and instruction;
   the monitor screen that is a monitor with a touch panel; and
   a means for putting a function of an information terminal for processing the input information and instruction upon receipt of the input from the touch panel, into an executable state when the outside surface of the flip unit and one surface of the main unit are closed in contact with each other.

7. A portable terminal as set forth in claim 3, further comprising:
   a storing means for storing electronic data;
   a means for converting a static image taken by said first photographic lens and said second photographic lens into electronic data; and
   a means for putting a photographic function as a digital camera into an executable state when the main unit and the flip unit are opened so as to direct said first photographic lens and said second photographic lens in an inverse direction.

8. A portable terminal as set forth in claim 7, further comprising:
   a means for converting a moving image take by said first photographic lens and said second photographic lens into electronic data; and
   a means for putting a photographic function as a digital video camera into an executable state when the main unit and the flip unit are opened so as to direct said first photographic lens and said second photographic lens in an inverse direction.

9. A portable terminal as set forth in claim 3, further comprising:
   a means for stopping a predetermined function to be finished, of the functions under activation, after judging that the function is in unused state when the inside surface of the main unit and the inside surface of the flip unit are closed in contact with each other.

* * * * *